United States Patent Office 3,206,821
Patented Sept. 21, 1965

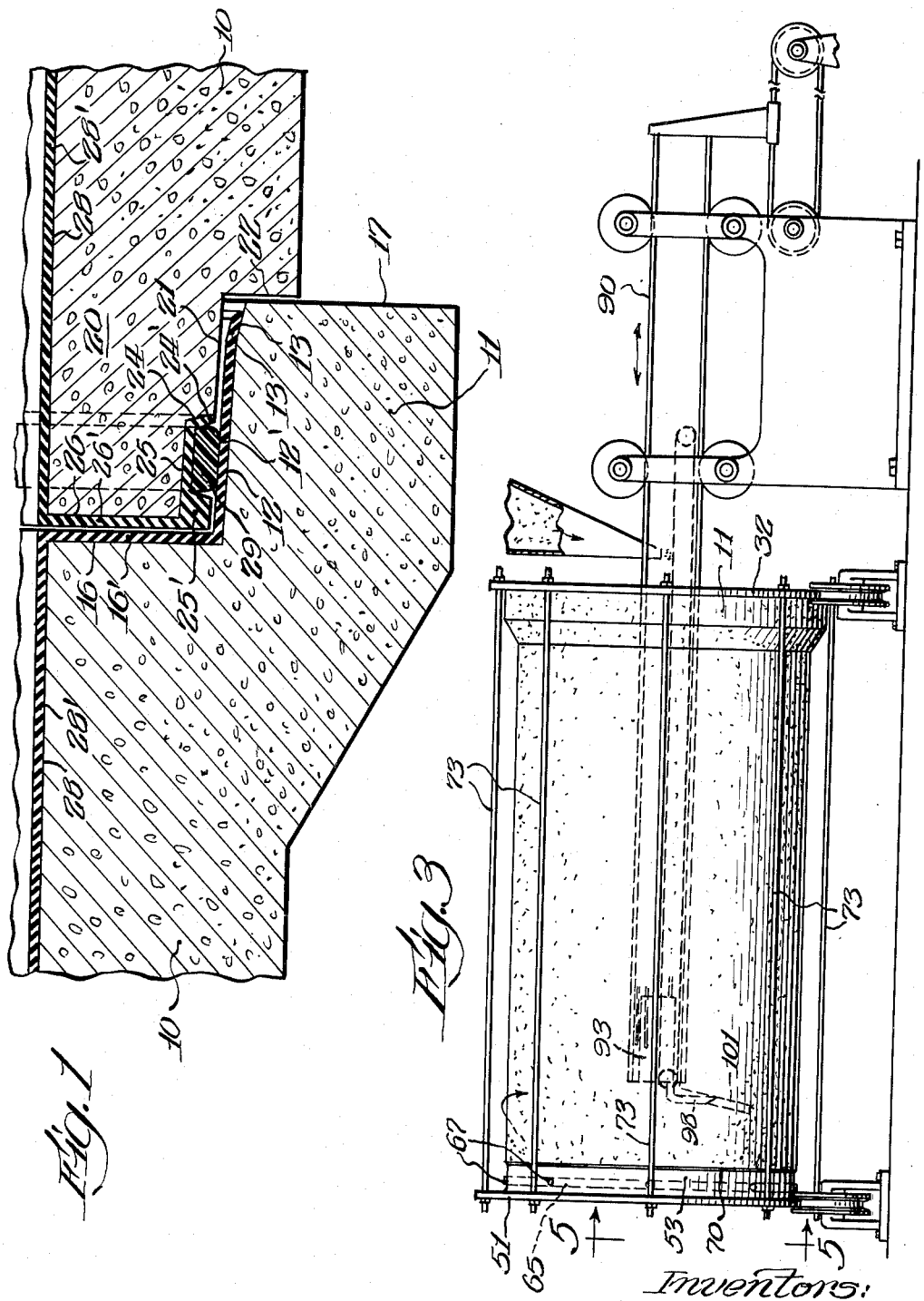

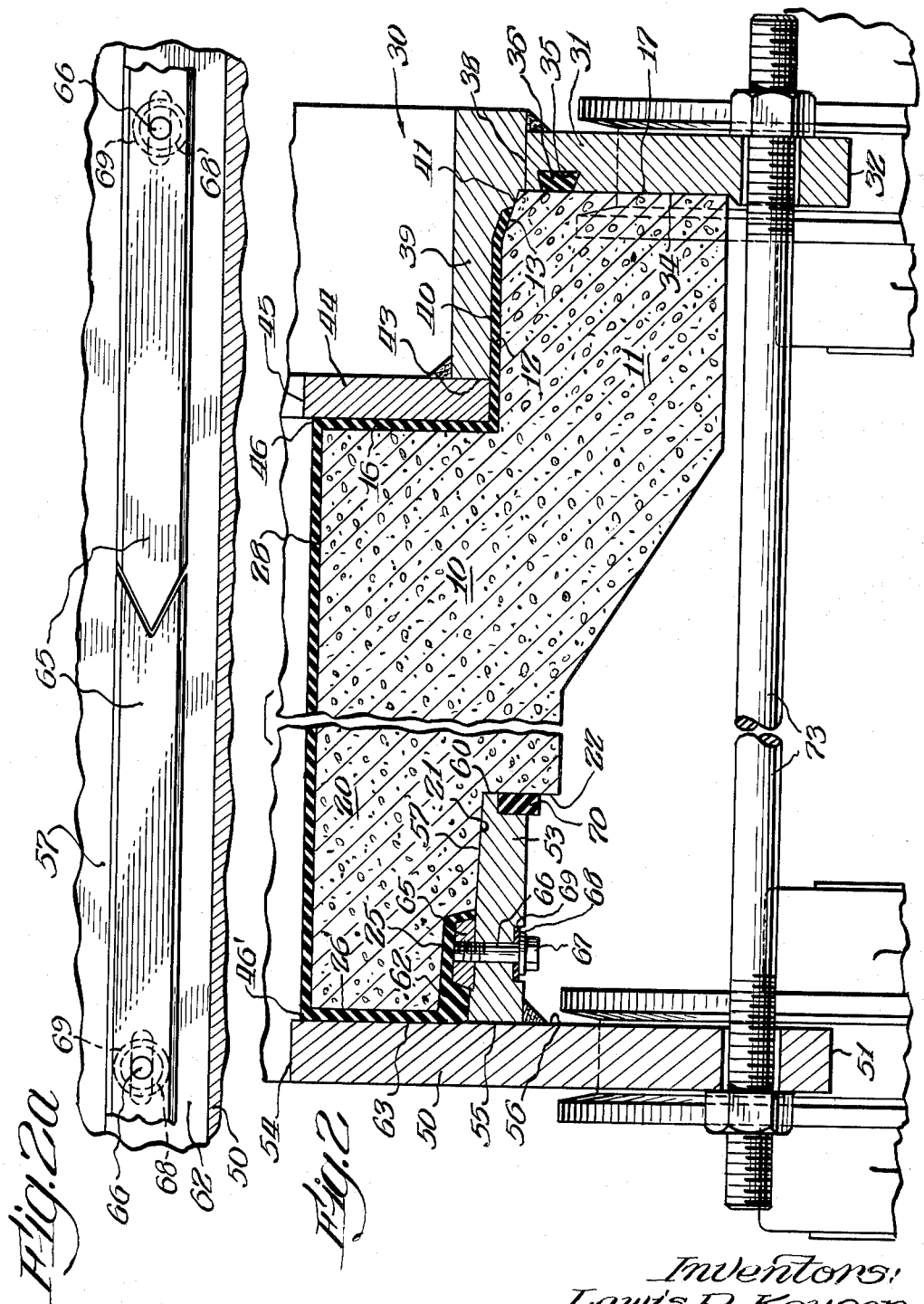

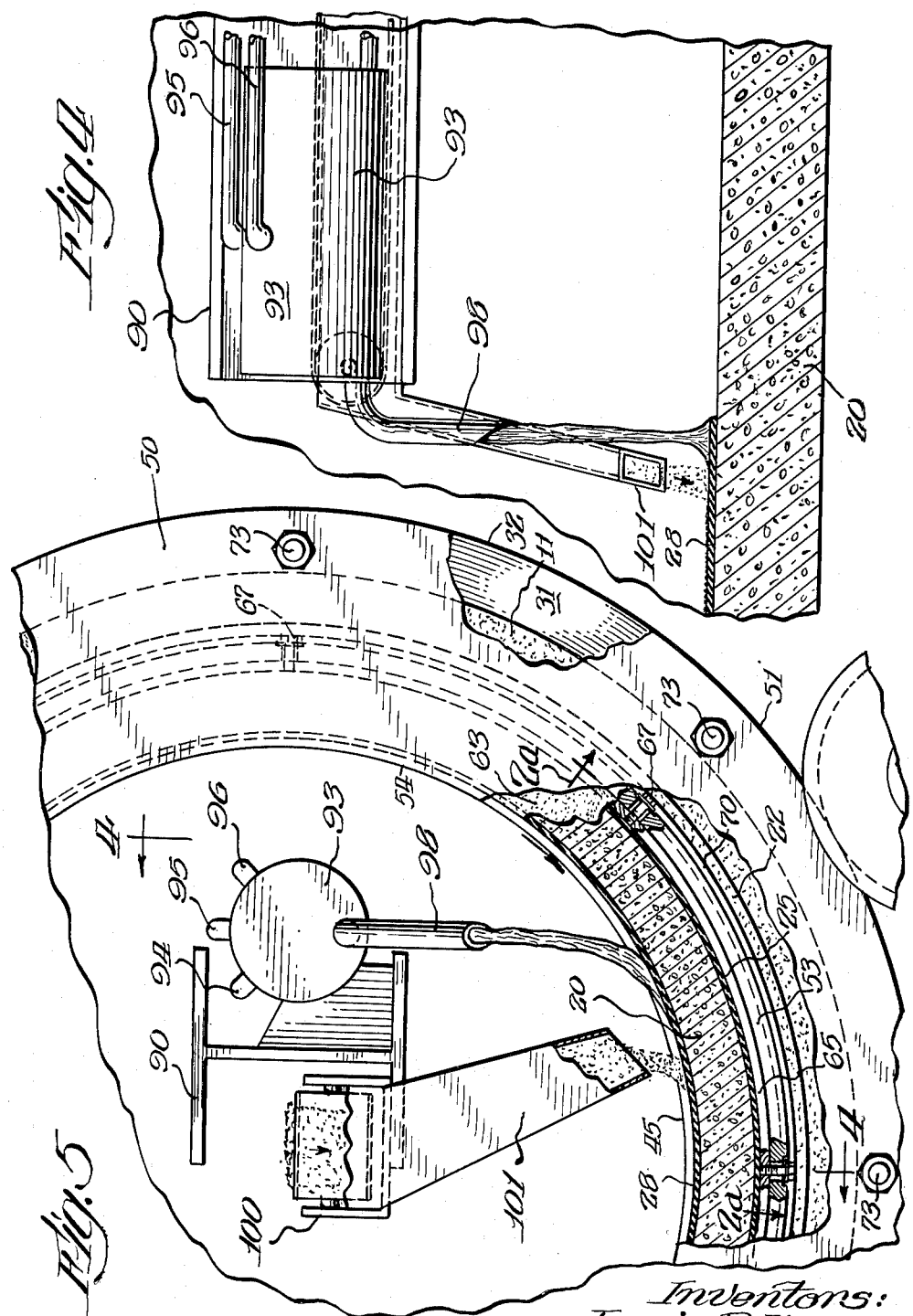

3,206,821
MEANS FOR MOULDING A COATING ON PIPE
Lewis R. Keyser and Paul L. Osweiler, Dayton, Ohio, assignors to Price Brothers Company, Dayton, Ohio, a corporation of Michigan
Filed Sept. 19, 1962, Ser. No. 224,671
3 Claims. (Cl. 25—38)

This invention relates to a means for centrifugally casting a continuous coating or lining for pipe, the lining or coating being continuous except for a gasket at the joint and being applied to said pipe in one operation. The invention is particularly applicable to large size pipe used for water or sewer purposes, with the pipe ranging in diameter up to as much as about nine feet and having lengths as great as about 24 feet for a pipe length. The desirability of providing a corrosion resistant lining for such pipe has been recognized for a long time. However, one of the serious drawbacks has been the lack of continuity of such a lining when going from one pipe length through a joint to a succeeding pipe length in a pipe line. Where corrosion is involved, it is understood that the slightest break in the lining will make it possible for corrosion to be initiated.

As a rule, adjacent lengths of pipe have suitable gaskets between them to insure a liquid-tight seal. Such gaskets may be made of any suitable material, such as rubber, for example, which is resistant to most chemicals being transported in pipe lines. It is of course possible to use materials other than rubber for gasket purposes.

A pipe, as a rule, may have a bell or spigot at each end or may have one of these at one end and the other at the other end. In any event, a joint will invariably involve the telescoping of a bell and spigot.

Considerable difficulty has been met with providing a coating of corrosion-resistant material in a simple and economical manner, which coating will be continuous along a pipe interior except for gasket material. Pipe interior surfaces exposed to liquid within the pipe include as a part thereof the end face and outer portion of a spigot up to the region where gasket engagement occurs. It is at this particular region where difficulty has been encountered in extending a lining or coating.

Many lining or coating operations do not lend themselves to successive steps, such as, for example, applying the lining or coating upon the cylindrical inner surface of the pipe and thereafter applying the same to the joints. As a rule, it is much more economical and better to have a lining or coating for a pipe which will satisfy the requirements for complete protection without relying upon any successive coating steps after the pipe is in the field.

The present invention comprises means for casting a coating in situ over the entire interior of a pipe and around and over the end portion of the spigot, as well as the entire interior of the bell of a pipe. It is only necessary for the coating to be in liquid form during the casting operation, after which said material may become solid.

The invention will now be disclosed in connection with the drawings wherein:

FIGURE 1 is a sectional detail of the bell and spigot ends of a pipe embodying the present invention.

FIGURE 2 is an elevation partly in section showing the ends of a pipe embodying the present invention mounted in pallets for spinning, the pipe being shown as having the lining applied thereto.

FIGURE 2a is a detail on line 2a—2a of FIGURE 5.

FIGURE 3 is a side elevation of a pipe in a spinning machine with lining material being fed thereto.

FIGURE 4 is a detail on line 4—4 of FIGURE 5.

FIGURE 5 is a view with certain parts in section on line 5—5 of FIGURE 3.

Referring to FIGURE 1, there is shown a detail of a portion of the ends of adjacent pipe lengths cooperating to provide a joint. As illustrated here, the end of one pipe is provided with a bell and the end of the adjacent pipe is provided with a spigot to form a joint wherein one gasket is used. It is understood, however, that this is exemplary and that the invention may be equally well applied to a joint wherein the opposing ends of adjacent pipes are similar, usually having a spigot-shaped end and provided with a ring or similar construction enclosing the ends of the two adjacent pipe lengths. Such an abutting pipe construction will require two gaskets.

Two pipe lengths 10 and 10′ are here illustrated. It is understood that in practice, pipe length 10 (and also 10′) will have a bell end at one end and a spigot at the other end. It is convenient to show these two ends of adjacent pipe lengths. Pipe 10 (and 10′) may have any desired construction. The pipe may be of concrete and may include, if desired, a steel shell. It may have prestressing wires or rods. Two adjacent pipes are so disposed that the ball end of one telescopes over the spigot end of the other for providing a joint of the type illustrated as an example in FIGURE 1. The provision of bell and spigot ends is also discretionary.

Concrete pipe 10 has bell end 11 comprising cylindrical or slightly tapering bell portion 12 and sharper tapering end portion 13. It is understood that in all cases, the tapers at the bell end will be such that the inside diameter of the pipe wall increases as the end face of the pipe length is approached. Thus cylindrical or slightly tapering bell portion 12 at its inner end meets inner end face 16 or the pipe to form a corner. Tapering end portion 13 meets outer end face 17 of the pipe. The various surfaces referred to are the surfaces of the pipe prior to the application of any lining thereto.

Pipe 10′ has spigot portion 20 provided with inner tapered surface 21, this extending away from the end face of the spigot end to form a sharp corner with outer end face 22 of the pipe. Inner tapered portion 21 has inwardly directed step 24, which step meets the inner end of outer spigot portion 25 of the spigot end of the pipe to form a corner. Outer spigot portion 25 continues to the end of the spigot where it meets inner end face 26 of the pipe to form a sharp corner. Inner end faces 16 and 26 of the bell and spigot parts respectively extend inwardly of the pipe where these end faces meet with the inner surface 28 of each pipe.

After a pipe is lined, inside surface 28 of each pipe will be covered with layer 28′ of the lining material. The lining material will extend along faces 16 and 26 to provide lining portions 16′ and 26′. For the bell end, lining portion 16′ will extend until it reaches lining portion 12′ and continue to portion 13′ of the lining material, these latter lining portions being over portions 12 and 13. The spigot portion has lining portion 26′ which extends outwardly until the lining reaches surface 25 where it merges into lining portion 25′ and continues to lining portion 24′.

As illustrated here, lining portion 25′ of the spigot is shaped to provide an annular channel or groove within which rubber or other gasket 29 may be disposed in the finished pipe when assembled to form a joint with an adjacent pipe. It is possible to have the gasket accommodating groove or channel in the lining present in portion 12′ of the lining in the bell, in which case the spigot could be smooth. The dimensions and shape of the pipe joint surfaces are designed so that when two adjacent pipes are fitted together to provide a joint, gasket 29 will cause the opposing solid surfaces of the lining material in the bell and spigot portions to be spaced from each other somewhat. Thus a tight seal can be provided by gasket 29. It is understood that the assembled joint may be finished by having grout or other compound applied over the outer portions of the adjoining pipe ends and this grout may run into the space between portion 21 of the spigot and lining portion 13' of the bell. Such grout, however, will be relied upon only for mechanically sealing the pipe against incoming materials. Insofar as corrosion resistance is concerned, it is evident that a pipe length having a continuous and unbroken corrosion resistant lining as illustrated and starting from lining portion 28' and going to lining portions 16', 12', gasket 29, lining portion 25' of the spigot, lining portions 26' and 28' of pipe length 10' will provide complete protection. It is important that the lining material extends in all cases beyond the region where a sealing gasket such as 29 bears against opposing pipe surfaces. Thus there will be an unbroken sealing surface extending from the lining of a bell to the gasket and thence to the lining of a spigot.

The same considerations will apply where two generally spigot-shaped ends are disposed in abutting relation with an annular collar around and having a pair of gaskets for providing a sealing action.

Referring to FIGURE 2, there are shown pallets for both the bell and spigot ends of the pipe. The bell end pallet is generally indicated by 30 and includes driving plate 31 having peripheral portion 32 which normally extends beyond the outer surface of the pipe and is adapted to rest upon and be driven by the surface of the spinning machine wheels. Driving plate 31 has inner face 34 which normally is disposed opposite face 17 of the bell end of the pipe. Inner face 34 of the driving plate is recessed at 35 to accommodate gasket 36. Gasket 36 is preferably located close to inner edge 38 of the driving plate. Gasket 36 is adapted to provide a sealing action against a portion of face 17 of the bell end of the pipe and functions to prevent any lining material from going beyond this gasket during the lining operation.

Gasket 36 is of any suitable material such as rubber, which can be used against the lining material to be applied. The gasket may be anchored in position by cement or, as illustrated here, may be forced into a recess having an appropriate shape for locking the gasket. Driving plate 31 has welded or rigidly attached to inner edge 38 thereof end ring 39. This end ring extends inwardly of the bell end of the pipe and except for portion 41, is undercut along surface (in the drawing this appears as a line) 40, so that most of ring portion 39 will be spaced from surfaces 12 and 13 of the bell end of the pipe.

Portion 41 of the end ring which is not undercut, is necessary to center the bell pallet with respect to the concrete pipe bell and thus provide a common axis of rotation for the pipe and pallet. Portion 41 also supports the bell end of the pipe by bearing against 13. End ring 39 carries at inner end 43 thereof inner end plate 44, which extends parallel to but is spaced from inner end face 16 of the concrete pipe. Inner end plate 44 has its inner edge 45 extending beyond inside surface 28 of the concrete pipe by a distance somewhat greater than the desired thickness of the lining to be applied. The entire pallet construction is preferably made of steel and welded together as shown.

The clearance between undercut portion 40 and surfaces 12 and 13 of the bell is the same as the desired lining thickness, in this instance about ⅛". The clearance between face 16 of the pipe and inner plate 44 is greater (about 3/16" to ¼") to provide a larger space for flow of the lining material to the area between surface 12 and undercut portion 40 and for counter-flow of air displaced by the lining material.

As a rule, during spinning, the lining material will hug face 16 of the concrete pipe and go upwardly or outwardly until it reaches concrete surface 12 and then concrete surface 13 of the bell end of the pipe. At the same time, displaced air will travel in counterflow relation along the surface of the pallet. It is important that the lining material be fed slowly enough to avoid clogging the corner where surfaces 16 and 12 of the pipe meet. When finished, the lining material fills up the entire clearance region. It is understood that the lining material need only be applied initially at 46 near the clearance between face 16 of the pipe and inner end plate 44 of the pallet. The spinning of the pipe creates sufficient centrifugal force so that the lining material runs up into the clearance space as indicated.

The pallet for shaping the spigot end of the pipe includes driving plate 50 with peripheral portion 51 to be engaged by the flanged driving rollers of the spinning machine. Driving plate 50 has annular ring 53 extending therefrom at a point spaced from inside edge 54 of the driving plate. Ring 53 has its end 55 disposed against inside surface 56 of end plate 50. Annular ring 53 is rigidly welded to plate 50 and is shaped to provide tapered inner face 57 which is disposed opposite surface 21 of the spigot portion of the pipe. Ring 53 is long enough so that its free end 60 may abut against face 22 of the pipe while having driving plate 50 disposed beyond end face 26 of the pipe by a distance somewhat greater than the thickness of lining to be applied to the surface of the concrete, in this instance by about 3/16". Inner face 57 of annular ring 53 is shaped to correspond to surface 21 of the pipe. The inner portion of annular ring 53 has portion 62 which slopes inwardly toward the center of the pipe from face 57 of the ring until it encounters face 63 of the driving plate. A snug engagement of ring 53 at the outer portion thereof with surface 21 of the pipe is necessary for centering the pipe. Other than that, there should be enough space between the inside face of annular ring 53 and face 25 of the spigot to provide for a build-up of lining material to generate or create a gasket groove or channel.

The gasket groove is created by split spring ring 65 which may be bolted at a number of places to the inside face of annular ring 53. Ring 65 has a desired shape such as illustrated, to create the groove within the lining material. The transverse shape of ring 65 is such that it will taper as shown to permit the withdrawal of this ring radially generally of the spigot. Gasket groove forming ring 65 is rigidly maintained in place by bolts 66, each having head 67 setting in a suitable groove in the top or outer face of annular ring 53. Metal washer 68 and rubber flexible washer 69 are provided between the ring part of the metal and the bolt head to prevent lining material from being thrown up and working along the bolt to the bolt head. Ring portion 65 is disposed in proper position with respect to inner face 57 of ring 53 so that the groove for accommodating the gasket will be formed at a predetermined elevation with respect to tapered face 25 of the spigot. Ring 65 is split to permit springing the ring free of the spigot after pallet removal.

Gasket 70 of suitable flexible material is disposed in a cut-out at the outer corner of ring 53 so that gasket 70 can press against face 22 of the pipe. The gasket is continuous circularly and may be positioned on the pallet prior to disposing the same against the pipe. The bell and spigot pallets are maintained in relative position by a series of long bolts 73 passing through suitable apertures in both of the driving plates. As many bolts may be provided around the driving plates as are necessary.

The lining material at the spigot end is initially applied on surface 28 at region 46' while the pipe is spinning. By controlling the amount of lining material feed with relation to the viscosity and also controlling the spin of the pipe, a smooth feed of lining material can be created from the inside surface of the concrete pipe at the spigot end along the pallet surface, centrifugal force directing the flow.

It will be remembered that in connection with the bell end, the lining material was fed along the concrete surface which was radially beyond the opposing surfaces of the pallet. Here at the spigot end, the lining material is fed so that it is radially on the outside of the clearance region between the pallet and spigot end of the pipe. By controlling the speed of pipe spinning so that an even flow will occur, the lining material will build up from the pallet metal and after the air is purged will wet the concrete at surface 25. The finished product will have the lining material forced into the concrete pores. Lining material is applied to the pipe inner surface after the pipe ends have been treated.

In the event that a gasket groove or channel is to be provided in the bell end rather than in the spigot end or possibly in addition to the spigot end, the provision of a split ring with bolts for the creation of the gasket groove will be necessary at the bell end.

The application of lining material to the inside of pipe may be accomplished in a number of ways. If the pipe is quite large in diameter, say, at least four or five feet in diameter, it is possible to apply the material manually. Insofar as the ends of the pipe are concerned, where the lining material is to go around the end surfaces to the outer surfaces of the pipe where the gasket engaged regions are, this may be applied manually irrespective of how large or how small the pipe is. Thus a pail of the lining material at a suitable temperature with or without quartz or other filler may be applied. A workman can have a pail of the material and pour the material slowly at the inside of the pipe at the region of the pipe end. It is understood that the pipe is horizontal and being spun.

Various other means for applying the lining material to the pipe may be provided. In general, the pipe after having the lining material applied thereto, will be spun just long enough so that the lining material becomes gelled or self-supporting and will not run or settle in the event that the pipe with the lining material is stationary and permitted to remain in one position for an indefinite length of time.

It is possible to provide a continuous lining for a pipe length from one end to another without having a special gasket groove. A sealing means will always be used in a joint. The only requirement for the invention, insofar as a joint structure is concerned, is that the joint surfaces be so shaped as to permit lining material to flow under centrifugal force from the inner pipe surface to the joint surfaces to form an unbroken lining surface at least to the area where the sealing means, usually a gasket, is applied.

A simple means for applying a lining material to the interior of a concrete pipe is illustrated in FIGURE 3. It is understood that the concrete pipe is supported for spinning in a manner shown in FIGURE 2 and that the means illustrated in FIGURE 3 supplement the pipe supports illustrated in FIGURE 2.

The various materials for applying the lining to the interior of a pipe are supported on a suitable structure extending within the pipe along the length thereof. This structure may include H beam 90 which may be moved longitudinally of the pipe in a manner generally resembling the corresponding structure in United States Patent No. 2,850,784. One of the lining supply means includes automatic metering and mixing means 93 having inlets 94, 95 and 96 for the components required.

Outlet pipe 98 discharges the mixed lining liquid as a stream. As mixing equipment 93 is moved lengthwise along the interior of the pipe, the mixed lining liquid will be discharged as a stream along the length of the pipe, it being understood that the pipe is being rotated or spun during this operation. Suitable means for turning the metering means on or off will be provided and control means are provided for controlling the amount of flow of the mixed lining liquid.

In order to apply finely divided quartz sand at a desired temperature, H beam 90 carries conveyor 100 carrying a quantity of quartz sand, the quartz sand being withdrawn at a uniform rate by the conveyor from a suitable storage bin. Such storage bin may have a means of heating or maintaining the sand at the specified elevated temperature. The heated sand is discharged from conveyor 100 onto chute 101. Chute 101 is so disposed as to discharge hot quartz sand over the mixed lining liquid as it issues from outlet pipe 98. It is preferred to discharge the hot quartz sand at a point where the lining material has already been discharged so that the hot quartz sand can fall upon the thin lining material. The hot sand or quartz will tend to further heat and thin the lining material in case the latter has cooled off somewhat whereby the hot quartz particles will sink into the relatively thin lining material by centrifugal force and be distributed therethrough.

Where the pipe material being treated is concrete, it will be found that the lining material penetrates into the pores of the concrete quite substantially and this part of the lining which is adjacent to the concrete surface may be so firmly bonded to the concrete as to make it impossible to remove the lining without tearing away the concrete that is bonded to the lining. Where the pipe surface to be coated is of metal, the resin will adhere with the usual tenacity characteristic of epoxy resins.

The lining material may be applied by other means than disclosed.

The invention generally requires that a pipe, whether it be of steel or iron or concrete or any other material, which is to be lined in accordance with the present invention, should have the end portions of the pipe, prior to the application of the lining material, free of any annular regions which are concave toward the axis of the pipe. Such an undesired annular region creates air pockets during the application of the lining material which impede the flow of lining material. Such air pockets make it difficult, and sometimes impossible, to coat the surfaces of the pipe material in the vicinity of or leading to the gasket engaging regions. It is understood that the gasket referred to is the gasket provided at a pipe joint in connection with final installation of the pipe. In practice, a pipe having a spigot end should, therefore, prior to lining, be free of any annular groove or channel on the outer spigot surface which would normally locate the position for a gasket. In certain types of pipe this requires only a slight modification of standard manufacturing equipment and technique. A pipe having a bell end can have an annular groove for locating a gasket, because such groove would be concave away from the axis of the pipe.

The pallets for supporting the ends of a length of pipe during the casting operation may assume a wide variety of shapes. The shape will depend in some measure upon the shapes of the end portions of a pipe length prior to the application of the lining. In general, however, each pallet will have one or more annular portions which should fit tightly against corresponding annular areas at the end portions of the unlined pipe. These corresponding annular areas should be so disposed and located that two pallets can center and clamp a pipe length to support it. The remainder of each pallet opposite a pipe end portion is undercut to provide clearance from the pipe to permit lining material to enter the clearance region under the influence of centrifugal force during spinning and deposit the lining material over desired areas of each end portion of a pipe length. As has been previously indicated, the clearance region should preferably have a minimum width between pipe and pallet of $3/16''$.

In general, the pallet clearance will permit the flow of lining material from the end of the cylindrical inner surface of a pipe (specifically surface 28 in the pipe) outwardly from the pipe axis and thence generally parallel to the pipe axis to the blind annular end of the entire clearance region.

Each pallet will preferably include an annular gasket to provide a seal between pallet and pipe for limiting the flow of coating or lining material. Where a coating or lining material is to be applied to a pipe end portion in such a manner as to provide an annular groove or channel for locating a pipe joint sealing gasket, a pallet will have as a removable part thereof suitably shaped members for defining such groove or channel.

What is claimed is:

1. An apparatus for casting a coating in situ in a pipe length having an inside diameter as large as 9 feet and having a stepped spigot at one end for cooperation with a bell portion to provide a joint, said cast coating extending continuously from the inside pipe surface over the end face of the pipe and over the exterior surface of the end step portion of the spigot, said spigot end step portion being circumferentially complete but extending from the pipe end face for part of the spigot length and providing an outwardly stepped, tapered base portion of the spigot adjacent the pipe body, said apparatus including said pipe length, means for spinning said pipe length with the pipe axis horizontal, an annular mould ring having an annular surface opposite the spigot exterior surface, said ring surface being tapered with the maximum inner diameter and the outer diameter of the outwardly stepped spigot base portion being dimensioned to provide a slide taper fit, which will center the ring about the spigot base portion, said spigot base portion and large end of the ring being shaped to limit telescoping the ring over the spigot base, said ring and opposing surface of the spigot end step portion being shaped and dimensioned for providing an annular space therebetween sufficient to accommodate a desired thickness of coating material, said ring, when in final position over the spigot, being long enough to extend for a short distance axially beyond the end face of the pipe, an end mould plate rigidly secured to the ring and abutting the free end of the ring throughout the ring circumference and being spaced from the end face of the pipe and extending parallel to the end face of the pipe toward the pipe axis far enough so that the coating material in liquid form during casting can collect to a desired thickness at the pipe interior surface and run along the pipe to the spigot end and then to the exterior surface of the spigot, means for maintaining said spigot mould portion in position with respect to said pipe, means for applying coating material in liquid form to the pipe interior during pipe spinning and means for guiding the liquid coating material at the other pipe end, whereby the coating from the inside pipe surface to the spigot exterior is homogeneous, can be applied at one time as a continuous layer and the desired spacing at the pipe end face and over the spigot portion is maintained, said mould clearances at the end face and about the spigot being large enough to permit displaced air to flow in counter-flow relation to the coating material.

2. The construction according to claim 1 wherein said mould portion at the spigot end that is spaced from the opposing surface of the end step spigot portion includes a snap ring normally disposed against the mould surface to shape an annular gasket retaining groove in the coating material at said spigot portion and includes means for releasing said snap ring from said mould portion after casting to leave said snap ring over the spigot coating while the mould is removed, said snap ring being removable from the coated spigot thereafter to expose said gasket receiving annular groove.

3. The construction according to claim 1 wherein the other end of the pipe is bell-shaped and wherein the means for guiding the coating material at the other pipe end comprises an annular mould having a portion engaging the free end of said pipe and having other portions of the mould opposed to but spaced from the bell surfaces, said bell end mould including a portion extending inwardly toward the pipe axis for a short distance beyond the inside surface of the pipe so that coating material in liquid form can build up on said inside surface to a desired thickness and can travel outwardly during spinning to the bell surfaces, said annular mould portion which engages the free end of said pipe terminating in a centering portion engaging the edge portion of the pipe formed by the intersection of a curved pipe surface and the end face of said pipe, and means for maintaining said bell mould portion in position with respect to said bell end of said pipe.

References Cited by the Examiner

UNITED STATES PATENTS

| | | | |
|---|---|---|---|
| 1,084,906 | 1/14 | Siegwart | 25—30 |
| 1,618,540 | 2/27 | Ligonnet. | |
| 1,644,361 | 10/27 | Talbot | 138—145 |
| 1,717,615 | 6/29 | Millspaugh | 138—145 |
| 2,120,309 | 6/38 | Carson | 117—95 |
| 2,337,981 | 12/43 | Eggeres | 117—95 |
| 2,416,618 | 2/47 | Ferla | 138—145 |
| 2,447,703 | 8/48 | Jenkins | 25—127 |
| 2,701,403 | 2/55 | Chanlund | 25—30 |
| 2,779,056 | 1/57 | Ligon | 25—127 |
| 2,847,707 | 8/58 | Sullivan | 18—26 |
| 2,929,124 | 3/60 | James | 25—127 |
| 2,962,052 | 11/60 | Sergovic | 138—145 |
| 2,994,919 | 8/61 | Schafer | 18—26 |
| 3,121,266 | 2/64 | Ewing | 18—26 |

FOREIGN PATENTS

| | | |
|---|---|---|
| 559,094 | 9/38 | France. |
| 3,466 | 2/96 | Great Britain. |

J. SPENCER OVERHOLSER, *Primary Examiner.*

EDWARD V. BENHAM, ROBERT F. WHITE, MICHAEL V. BRINDISI, WILLIAM J. STEPHENSON, *Examiners.*